United States Patent
Kern et al.

(10) Patent No.: US 8,108,503 B2
(45) Date of Patent: Jan. 31, 2012

(54) DYNAMIC LOAD BALANCING BETWEEN CHASSIS IN A BLADE CENTER

(75) Inventors: Eric Richard Kern, Chapel Hill, NC (US); William Gabriel Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 12/353,534

(22) Filed: Jan. 14, 2009

(65) Prior Publication Data

US 2010/0180025 A1 Jul. 15, 2010

(51) Int. Cl.
*G06F 15/173* (2006.01)

(52) U.S. Cl. ........ 709/223; 709/224; 709/225; 709/250; 711/6; 718/105

(58) Field of Classification Search .................. 709/223, 709/250

See application file for complete search history.

(56) References Cited

U.S. PATENT DOCUMENTS

| | | | |
|---|---|---|---|
| 6,691,165 B1 | 2/2004 | Bruck et al. | |
| 6,847,618 B2* | 1/2005 | Laursen et al. | 370/261 |
| 7,062,556 B1 | 6/2006 | Chen et al. | |
| 7,075,893 B1* | 7/2006 | Mlinarsky et al. | 370/241 |
| 7,161,939 B2* | 1/2007 | Israel et al. | 370/389 |
| 7,441,261 B2* | 10/2008 | Slater et al. | 725/96 |
| 7,444,459 B2* | 10/2008 | Johnson | 711/6 |
| 7,480,720 B2* | 1/2009 | Chu et al. | 709/226 |
| 7,509,401 B2* | 3/2009 | Takamoto et al. | 709/220 |
| 7,590,727 B1* | 9/2009 | Barnes | 709/224 |
| 7,590,746 B2* | 9/2009 | Slater et al. | 709/229 |
| 7,643,420 B2* | 1/2010 | Kwan et al. | 370/235 |
| 7,805,600 B2* | 9/2010 | Bucher et al. | 713/2 |
| 7,873,594 B2* | 1/2011 | Harada et al. | 707/603 |
| 7,908,368 B2* | 3/2011 | Strole | 709/224 |
| 7,916,718 B2* | 3/2011 | Loh et al. | 370/363 |
| 7,941,539 B2* | 5/2011 | Tripathi et al. | 709/226 |
| 7,944,923 B2* | 5/2011 | Tripathi et al. | 370/392 |
| 7,945,647 B2* | 5/2011 | Tripathi | 709/220 |
| 7,962,587 B2* | 6/2011 | Tripathi | 709/222 |
| 7,970,951 B2* | 6/2011 | Tripathi et al. | 709/250 |

(Continued)

FOREIGN PATENT DOCUMENTS

JP 2003114879 4/2003

OTHER PUBLICATIONS

Wikipedia, Blade Server, pp. 1-5.*

(Continued)

*Primary Examiner* — Kamal Divecha
*Assistant Examiner* — Backhean Tiv
(74) *Attorney, Agent, or Firm* — Cynthia G. Seal; Law Office of Jim Boice

(57) ABSTRACT

A computer-implemented method, system and computer program product for load balancing between different blade chassis within a blade center are presented. Each blade chassis is monitored for total data traffic to and from that blade chassis. If a first blade chassis within the blade center is overworked, then a most overtaxed blade within that first blade chassis is disabled. A less utilized second blade chassis within the blade center is then identified, and a least taxed blade within the second blade chassis is assigned to take over the workload of the disabled blade from the first blade chassis.

15 Claims, 6 Drawing Sheets

U.S. PATENT DOCUMENTS

| | | | | |
|---|---|---|---|---|
| 2002/0184369 | A1* | 12/2002 | Parkinson | 709/226 |
| 2003/0120772 | A1* | 6/2003 | Husain et al. | 709/224 |
| 2003/0154236 | A1* | 8/2003 | Dar et al. | 709/201 |
| 2004/0010544 | A1* | 1/2004 | Slater et al. | 709/203 |
| 2004/0088414 | A1* | 5/2004 | Flynn et al. | 709/226 |
| 2004/0111529 | A1 | 6/2004 | Parmar | |
| 2004/0264398 | A1* | 12/2004 | Chu et al. | 370/312 |
| 2005/0053008 | A1* | 3/2005 | Griesing et al. | 370/241 |
| 2005/0080923 | A1* | 4/2005 | Elzur | 709/238 |
| 2005/0147117 | A1* | 7/2005 | Pettey et al. | 370/463 |
| 2006/0069761 | A1* | 3/2006 | Singh et al. | 709/222 |
| 2007/0180280 | A1* | 8/2007 | Bolan et al. | 713/300 |
| 2007/0258463 | A1* | 11/2007 | Rhoades et al. | 370/395.52 |
| 2008/0022148 | A1* | 1/2008 | Barnea et al. | 714/5 |
| 2008/0034052 | A1 | 2/2008 | Bess et al. | |
| 2008/0066073 | A1 | 3/2008 | Sen | |
| 2008/0104236 | A1* | 5/2008 | Yoshikawa et al. | 709/224 |
| 2008/0126542 | A1* | 5/2008 | Rhoades et al. | 709/225 |
| 2008/0133749 | A1* | 6/2008 | Sample | 709/224 |
| 2008/0275975 | A1* | 11/2008 | Pandey et al. | 709/223 |
| 2008/0285435 | A1* | 11/2008 | Abdulla et al. | 370/217 |
| 2008/0310410 | A1* | 12/2008 | Mathiasen | 370/389 |
| 2009/0006541 | A1* | 1/2009 | Baba et al. | 709/203 |
| 2009/0049161 | A1* | 2/2009 | Takeuchi et al. | 709/222 |
| 2009/0089793 | A1* | 4/2009 | Nandagopal et al. | 718/105 |
| 2009/0094594 | A1* | 4/2009 | Walker | 717/174 |
| 2009/0138580 | A1* | 5/2009 | Takamoto et al. | 709/222 |
| 2009/0157870 | A1* | 6/2009 | Nakadai | 709/224 |
| 2009/0172125 | A1* | 7/2009 | Shekhar et al. | 709/215 |
| 2009/0327392 | A1* | 12/2009 | Tripathi et al. | 709/201 |
| 2010/0042869 | A1* | 2/2010 | Szabo et al. | 714/4 |
| 2010/0172260 | A1* | 7/2010 | Kwan et al. | 370/252 |
| 2010/0180025 | A1* | 7/2010 | Kern et al. | 709/224 |

OTHER PUBLICATIONS

Wikipedia, Network interface controller, pp. 1-3.*

B. Urgaonkar et al. "Agile Dynamic Provisioning of Multi-Tier Internet Applications," ACM Transactions on Autonomous and Adaptive Systems, Mar. 2008, pp. 1-39, vol. 3, No. 1, Article 1, New York, NY 10121-0701.

FB Maciel et al. "Dynamic Gateways: A Novel Approach to Improve Networking Performance and Availability on Parallel Servers," High-Performance Computing and Networking, International Conference and Exhibition Proceedings, Apr. 21-23, 1998, pp. 678-687, IEE, Amsterdam, Netherlands.

T. Schlegel et al. "Towards Autonomous Mobile Agents With Emergent Migration Behaviour," AAMAS'06, May 8-12, 2006, pp. 585-592, ACM, Hakodate, Hokkaido, Japan.

* cited by examiner

DYNAMIC LOAD BALANCING BETWEEN CHASSIS IN A BLADE CENTER

BACKGROUND OF THE INVENTION

1. Technical Field

The present disclosure relates to the field of computers, and specifically to blade servers. Still more particularly, the present disclosure relates to load balancing between blade chassis in a blade center.

2. Description of the Related Art

While early computer architectures utilized stand-alone single computers, often referenced as Personal Computers (PCs), more powerful modern computer systems often use multiple computers that are coupled together in a common chassis. An exemplary common chassis is known as a blade chassis, which includes multiple blades that are coupled by a common backbone within the blade chassis. Each blade, called a server blade when the blade chassis functions as a blade server for an enterprise, is a pluggable board that comprises at least one processor, on-board memory, and an Input/Output (I/O) interface. The multiple blades are capable of communicating with one another, as well as sharing common resources, such as storage devices, monitors, input devices (keyboard, mouse), etc.

Multiple blade chassis make up a blade center. A blade center is often dedicated to a single enterprise and/or a particular function, such as processing loans, managing payroll, etc. Because the blade center is made up of multiple blade chassis, an imbalance in workload between different blade chassis often occurs. Current load balancing typically does little more than moving work from an overloaded chassis to a less busy chassis by monitoring total data traffic to the different chassis. This type of load balancing does little to detect and correct underlying reasons for the load imbalance.

SUMMARY OF THE INVENTION

To address the issue described above, a computer-implemented method, system and computer program product for load balancing between different blade chassis within a blade center are presented. Each blade chassis is monitored for total data traffic to and from that blade chassis. If a first blade chassis within a cluster of blade chassis is overworked, then a most overtaxed blade within that first blade chassis is disengaged. A less utilized second blade chassis within the cluster of blade chassis is then identified, and a least taxed blade within the second blade chassis is assigned to take over the workload of the disengaged blade from the first blade chassis.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
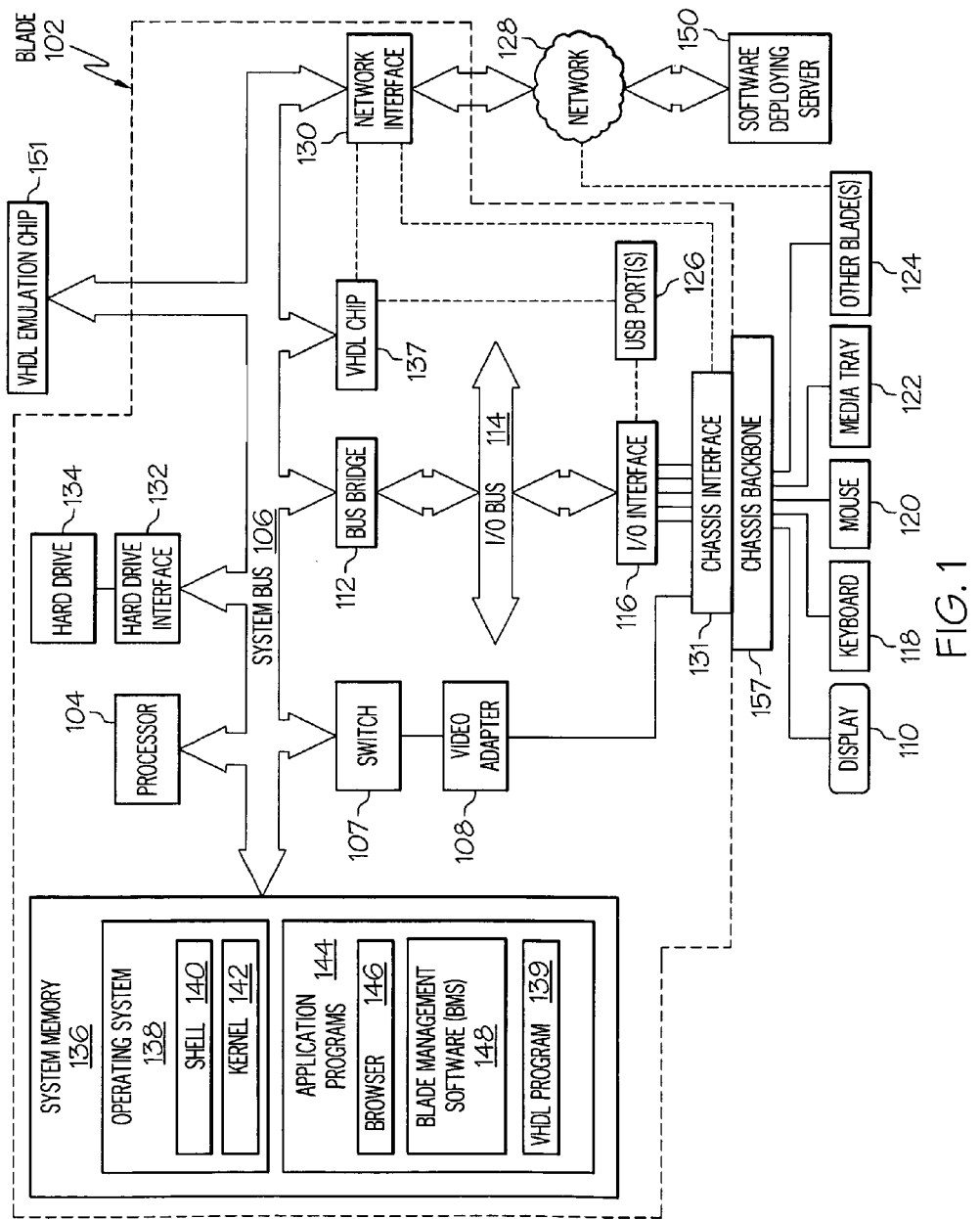
FIG. 1 depicts an exemplary server blade that may be utilized by the present invention.

With reference now to the figures, and in particular to FIG. 1, there is depicted a block diagram of an exemplary blade 102, which may be utilized by the present invention. Blade 102 is a component of a server blade chassis (depicted below in FIGS. 2-3 as blade chassis 202, 204, and/or 302). Blade chassis 202, 204, and/or 302 are usually utilized as a server; thus, blade 102 may be referenced as a server blade. Note that some or all of the exemplary architecture shown for blade 102 may be utilized by software deploying server 150 and/or other blades 124, which may be within a same blade chassis as blade 102.

Blade 102 includes a processor unit 104 that is coupled to a system bus 106. Processor unit 104 may utilize one or more processors, each of which has one or more processor cores. A video adapter 108, which drives/supports a display 110, is also coupled to system bus 106 via a chassis interface 131 to a chassis backbone 157 (described in greater detail below). In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., Blade Management Software—BMS 148 described below) that perform the method described herein. This switching causes a substantive transformation of the blade 102 from a system in which pending steps and/or results of the herein described method are NOT displayed, into a system in which these results ARE displayed.

System bus 106 is coupled via a bus bridge 112 to an Input/Output (I/O) bus 114. An I/O interface 116 is coupled to I/O bus 114. I/O interface 116 affords communication with various I/O devices either directly or via the chassis interface 131, which is hardware and/or software that allows the blade 102 to be coupled to chassis backbone 157 in a blade chassis. Once coupled to the chassis backbone 157, the blade 102 is able to communicate with other devices in addition to the display 110, including a keyboard 118, a mouse 120, a media tray 122 (which may include storage devices such as CD-ROM drives, multi-media interfaces, etc.), other blade(s) 124 that are within a blade chassis, and (if a VHDL chip 137 is not utilized in a manner described below), USB port(s) 126. Note that while other blade(s) 124 are shown as being coupled to blade 102 via the chassis interface 131, in one embodiment these other blade(s) 124 can be coupled to blade 102 via network 128, particularly if network 128 is a Local Area Network (LAN) within a blade center. While the format of the ports connected to I/O interface 116 may be any known to those skilled in the art of computer architecture, in a preferred embodiment some or all of these ports are Universal Serial Bus (USB) ports.

As depicted, blade 102 is able to communicate with a software deploying server 150 and, in one embodiment, with other blade(s) 124 within a blade chassis, via network 128 using a network interface such Network Interface Cards (NICs) 130, which are either directly coupled to system bus 106, or alternatively, are coupled to system bus 106 via the chassis interface 131. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in blade 102. This volatile memory includes additional higher levels of volatile memory (not shown), including, but not limited to, cache memory, registers and buffers. Data that populates system memory 136 includes blade 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., blade 102) to send and receive network messages to the Internet using HyperText Transfer Protocol (HTTP) messaging, thus enabling communication with software deploying server 150 and other described computer systems.

Application programs 144 in blade 102's system memory (as well as software deploying server 150's system memory) also include Blade Management Software (BMS) 148. BMS 148 includes code for implementing the processes described below, including those described in FIGS. 2-3. In one embodiment, blade 102 is able to download BMS 148 from software deploying server 150, including in an on-demand basis. Note further that, in one embodiment of the present invention, software deploying server 150 performs all of the functions associated with the present invention (including execution of BMS 148), thus freeing blade 102 from having to use its own internal computing resources to execute BMS 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from BMS 148 causes VHDL program 139 to configure VHDL chip 137, which may be an FPGA, ASIC, etc. This programming of VHDL chip 137 causes a substantial transformation of the architecture of blade 102, wherein (assuming that USB port(s) 126 are NOT coupled to I/O interface 116 and NICs 130 are NOT directly coupled to system bus 106) USB port(s) 126 and NICs 130 are now selectively coupled to system bus 106 via VHDL chip 137.

In another embodiment of the present invention, execution of instructions from BMS 148 results in a utilization of VHDL program 139 to program a VHDL emulation chip 151. VHDL emulation chip 151 may incorporate a similar architecture as described above for VHDL chip 137. Once BMS 148 and VHDL program 139 program VHDL emulation chip 151, VHDL emulation chip 151 performs, as hardware, some or all functions described by one or more executions of some or all of the instructions found in BMS 148. That is, the VHDL emulation chip 151 is a hardware emulation of some or all of the software instructions found in BMS 148. In one embodiment, VHDL emulation chip 151 is a Programmable Read Only Memory (PROM) that, once burned in accordance with instructions from BMS 148 and VHDL program 139, is permanently transformed into a new circuitry that performs the functions of elements 206, 208, 210, 212 and/or 214a-b shown below in FIG. 2. Thus, VHDL emulation chip 151 is also properly viewed as a machine that is under the control of blade 102. Note that while VHDL emulation chip 151 is depicted as being a different entity that is separate from blade 102, in another embodiment VHDL emulation chip 151 may be an integral part of blade 102.

The hardware elements depicted in blade 102 are not intended to be exhaustive, but rather are representative to highlight essential components required by the present invention. For instance, blade 102 may include alternate memory storage devices such as magnetic cassettes, Digital Versatile Disks (DVDs), Bernoulli cartridges, and the like. These and other variations are intended to be within the spirit and scope of the present invention.

Figure 2:
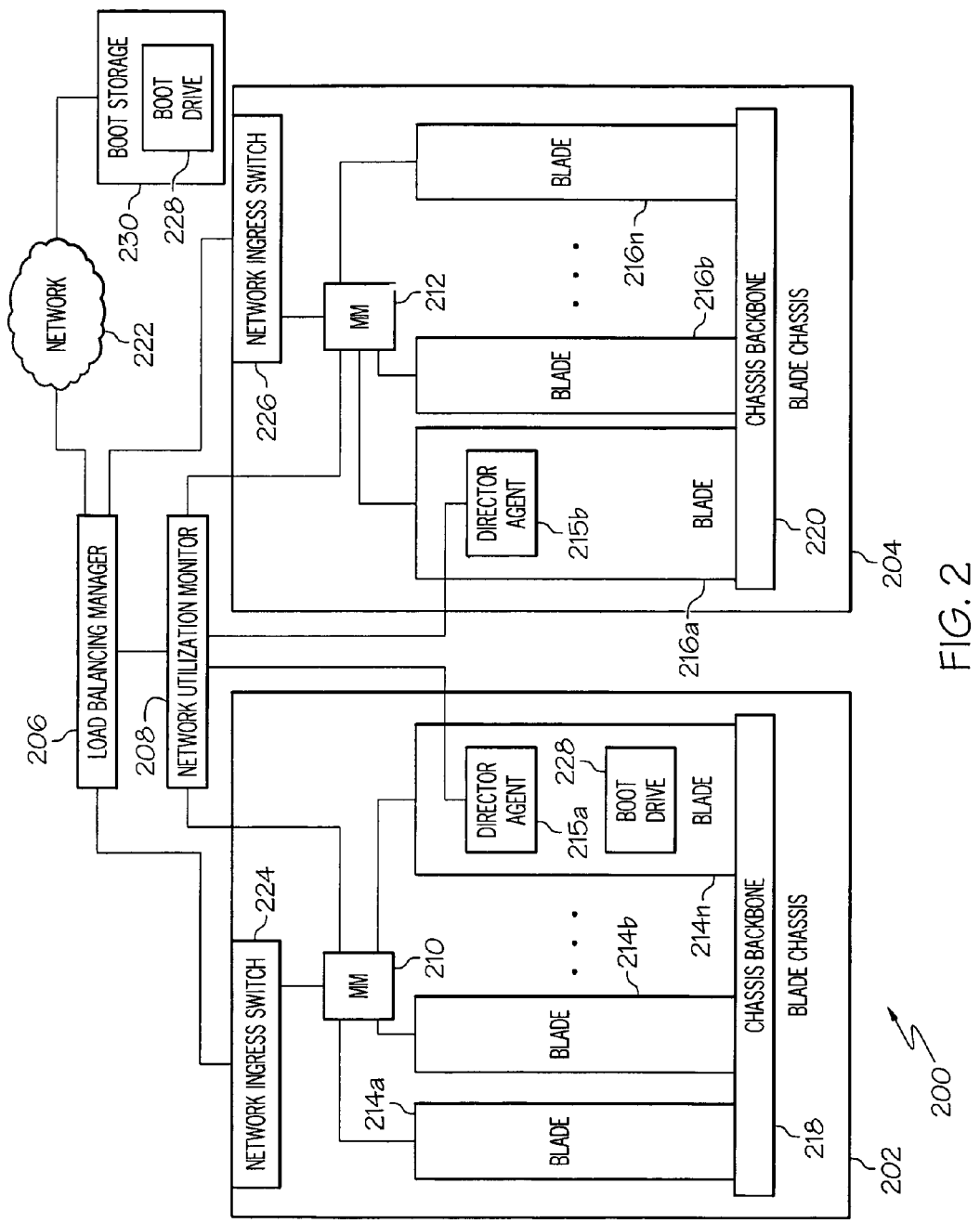
FIG. 2 illustrates a unique and novel blade center that automatically load balances work between blade chassis within the blade center.

Referring now to FIG. 2, an exemplary blade center 200 as contemplated for use by and with the present invention is presented. Blade center 200 comprises at least two blade chassis, shown as blade chassis 202 and blade chassis 204. Within blade chassis 202 is a plurality of blades 214a-n, where "n" is any integer, but is preferably 14. Within blade chassis 204 is a plurality of blades 216a-n, where "n" is any integer, and in which "n" may be more than, fewer than, or equal to the number of blades 214 in blade chassis 202. Blades 214a-n (each referenced individually as a set/subset without specificity as 214) are coupled to a chassis backbone 218, which provides mechanical and logical connections (e.g., data and control signal interchange) among the blades 214a-n. Similarly, blades 216a-n are coupled to a chassis backbone 220.

Blades 214a-n and blades 216a-n are respectively managed by Management Modules (MMs) 210 and 212. Each MM includes a processor (not shown) for controlling Input/Output (I/O) functions of specific blades, interfacing a specific blade with a network (e.g., network 222, shown in FIG. 1 as network 128), and allocating jobs and data to specific blades.

Each blade contains a director agent (shown respectively as director agent 215a for exemplary blade 214n and director agent 215b in blade 216a). Director agents 215a-b are copies of a same piece of software that communicates with a network utilization monitor 208 and/or a load balancing manager 206. Network utilization monitor 208 is software logic that monitors utilization levels of chassis and/or blades (e.g., how "busy" they are). Load balancing manager 206 allocates work and data packets from network 222 to specific blades by addressing such traffic to specific blades via a software switch such as a network ingress switch (depicted as network ingress switches 224 and 226).

As depicted in FIG. 2, a director agent 215 (depicted as 215a or 215b) is responsible for monitoring the activity level (e.g., what percentage of internal hardware resources such as bus bandwidth, CPU usage, etc. is being utilized) of a specific blade. The network ingress switch (depicted as 224 or 226) provides traffic monitoring information to the load balancing manager 206 and/or the network utilization monitor 208 (via a MM) that reflects the activity level of the entire blade chassis (e.g., the activity level of all blades within a particular blade chassis).

As will be described in further detail below, if a blade in a first chassis is deemed to be overutilized (overworked), then another blade in a second chassis will take over the operations of the overworked blade in the first chassis. In a preferred embodiment, the blade in the first chassis is deactivated by programmatically remapping a boot drive from the first blade to the second blade. For example, assume that blade 214n is the overworked blade. To disengage blade 214n, the boot drive 228 is disabled, thus taking down the operating system for blade 214n. Assuming that blade 216a will be taking over the operations of blade 214n, blade 216a now is directed to map to the boot drive 228 (stored in a boot storage 230), in order to engage blade 216a using the same boot drive 228 as was previously used by blade 214n.

Figure 3:
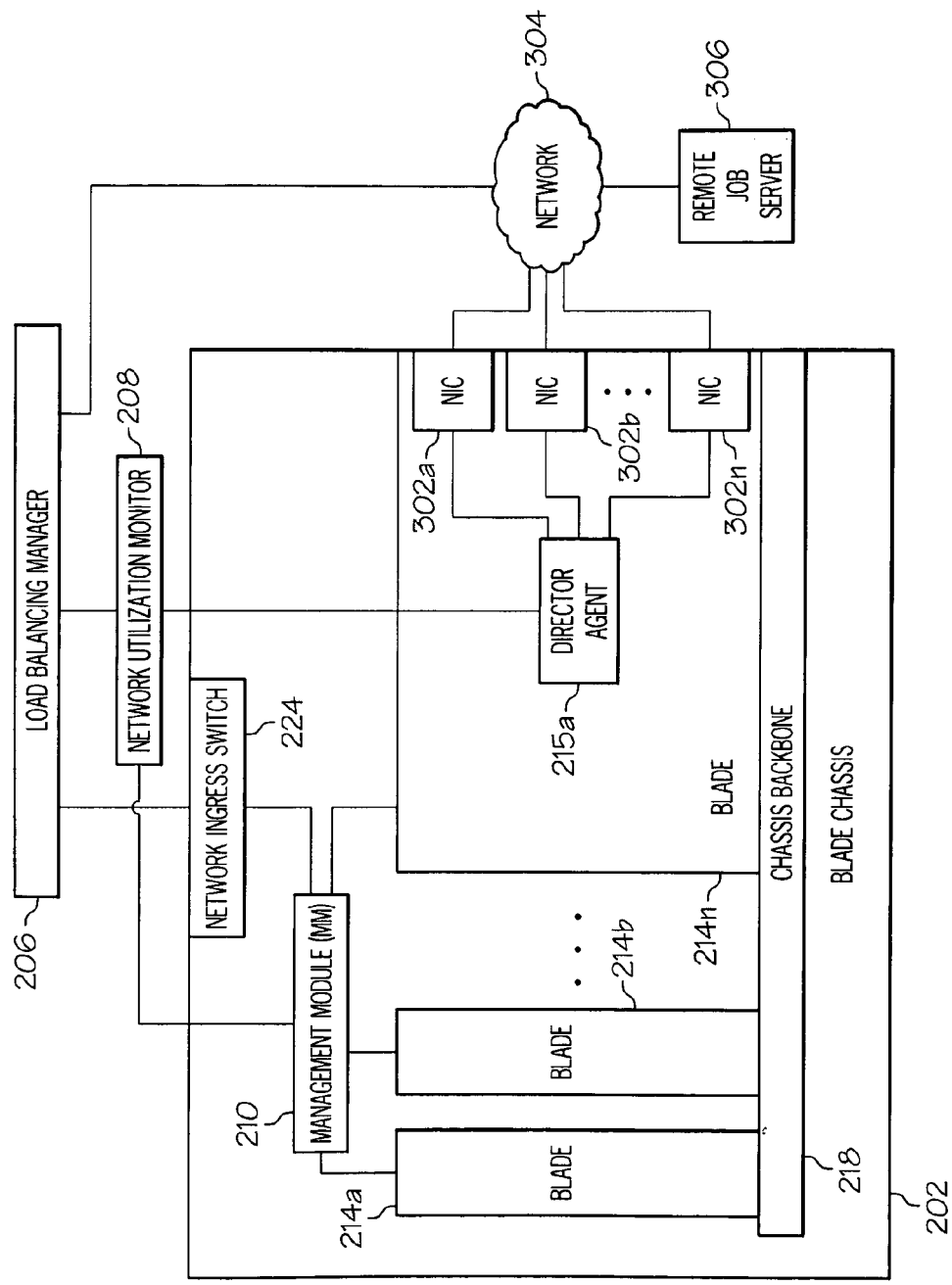
FIG. 3 depicts additional detail of a blade chassis shown in FIG. 2.

With reference now to FIG. 3, additional detail of a blade (exemplary blade 214n shown in FIG. 2) is presented. As depicted, blade 214n uses multiple NICs 302a-n to communicate with a network 304 (shown in FIG. 1 as network 128 and FIG. 2 as network 222). Network 304 provides network traffic (e.g., data, instructions, jobs, etc.) to and from blade 214n. This traffic may be from other blades 214 within blade chassis 202, but in the context of the present invention is preferably from outside blade chassis 202, such as from a remote job server 306, etc. Director agent 215a monitors the traffic activity level going through the NICs 302a-n. This monitoring permits the director agent 215a to determine how "busy" blade 214n is. In one embodiment of the present invention, director agent 215a focuses its monitoring on outgoing (egressing) data. Thus, by comparing how much data traffic comes into the blade 214n (from the network 304 via the load balancing manager 206 and network ingress switch 224) with how much data traffic leaves the blade 214n (wherein the egressing data is the result of data processing by blade 214n of packets received from network ingress switch 224), a determination can be made by the load balancing manager 206 and/or the network utilization manager 208 as to how overloaded ("overutilized") the blade 214n is. That is, if there is an unduly long delay (based on a pre-determined time length) between when a job comes into the blade 214n and when the output from that job leaves the blade 214n, then a proper assumption can be made that the resources within blade 214n are being overtaxed, and thus blade 214n is a good candidate for being taken off line and replace by another (e.g., more powerful or less busy) blade in another chassis. Note that in a preferred embodiment, one blade within a blade chassis does not replace another blade in that same blade chassis, since a primary focus of the preferred embodiment is to balance workloads between blade chassis, not just between individual blades.

Figure 4:
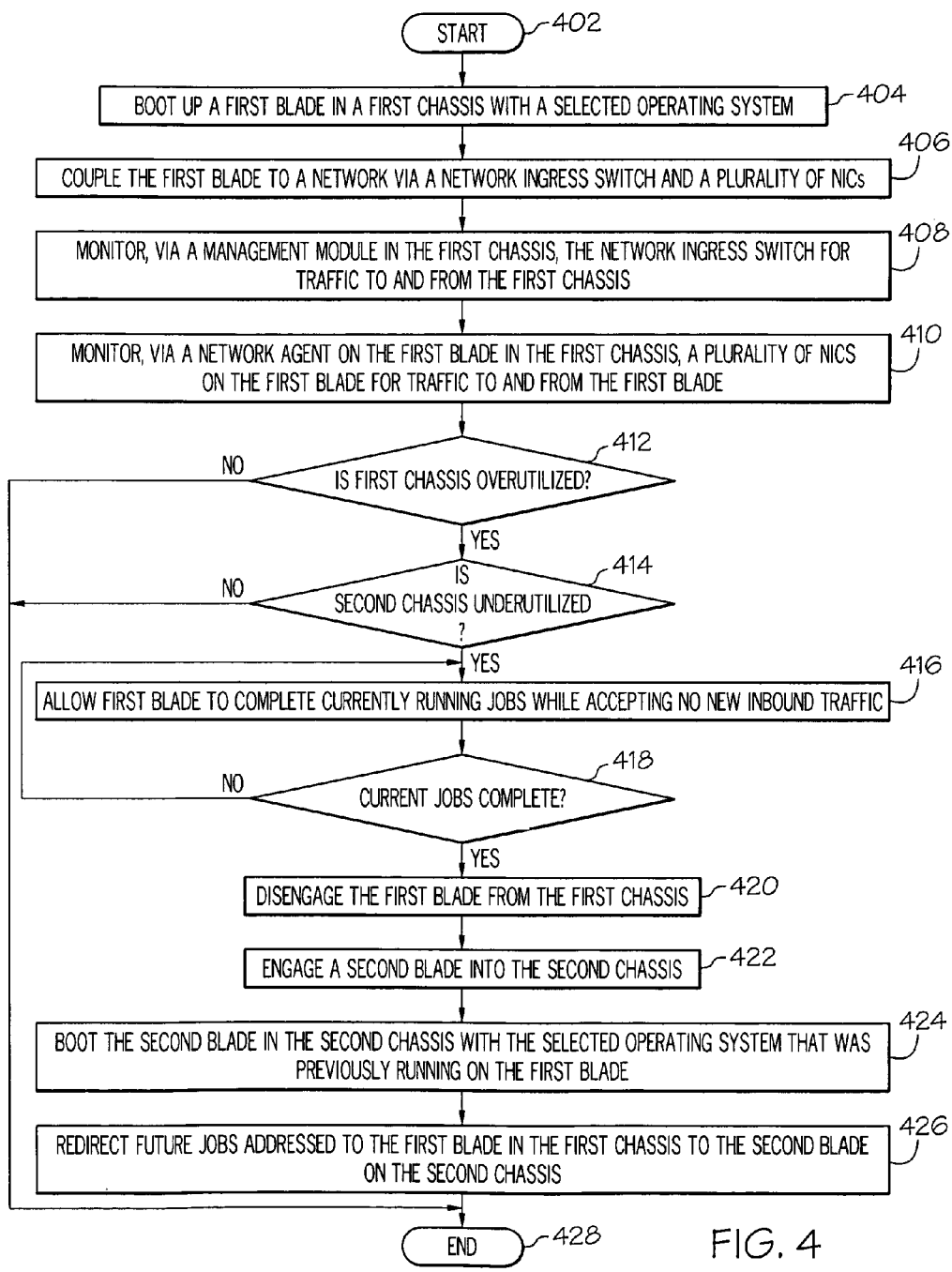
FIG. 4 is a flow-chart of exemplary steps taken to load balance work between blade chassis within the blade center.

With reference now to FIG. 4, a flow-chart of exemplary steps taken by the present invention to load balance between or among different blade chassis is presented. After initiator block 402, a first blade is booted up in a first chassis (block 404). This first blade is booted using a selected operating system, which may be specific for a particular type of job that is to be sent to the first blade by a management module. This first blade is coupled to a network via both a network ingress switch as well as a plurality of NICs (block 406), as depicted above in FIG. 3. The management module then monitors the network ingress switch for network traffic that is addressed to the first blade in the first chassis (block 408). In addition, a network agent on the first blade is monitoring network traffic that is moving through the NICs on the first blade (block 410).

As depicted in query block 412, a determination is made as to whether the first chassis is being overutilized. There are different computer-implemented methods that may be used to determine whether the first chassis is being overutilized. In one embodiment, this determination is made by measuring a first resource usage level for the first chassis, wherein a resource usage level is based on how many total hardware resources from blades in the first chassis are being used compared to how many total resources are available from blades in the first chassis. A second resource usage level is measured for the second chassis, wherein the second resource usage level is less than the first resource usage level. A difference between the first resource usage level and the second resource usage level is then computed to determine a resource usage level difference. Thus, it is determined that the first chassis is overutilized if the resource usage level difference exceeds a pre-defined action level.

In another embodiment, determining that the first chassis has been overutilized is accomplished by first measuring first blade chassis data traffic, wherein the first blade chassis data traffic is data traffic that is addressed to the first blade and that passes through the network ingress switch. The next step is to measure first blade NIC data traffic, wherein the first blade NIC data traffic is data traffic that has been processed by the first blade and egresses from the first blade. Finally, a difference between the first blade chassis data traffic and the first blade NIC data traffic is computed, wherein a pre-determined large difference indicates an overwhelming of resources in the first blade in the first chassis.

In one embodiment, the first blade is identified as an overutilized blade to be decoupled by determining that data traffic on the NICs exceeds a predetermined NIC data traffic level. This predetermined NIC data traffic level may be set by a management module, a network utilization manager, a network utilization monitor, or any administrator with appropriate overseeing authority.

If the first chassis is being overutilized, and the overworked blade has been identified, then a query is made for an underutilized second chassis (query block 414). This query is made using the same criteria and devices described above for determining that the first chassis was overutilized. That is, if a second chassis has a "light" amount of network traffic going to it (as determined by the network ingress switch monitoring procedure described above), then the second chassis is determined to be a good candidate for accepting the work from the overworked first blade in the first chassis. The destination of future work (that would have been sent to the overworked first blade in the first chassis) will be a least utilized blade in the second chassis. This least utilized blade is identified using the same procedures used to identify the overworked first blade in the first chassis. That is, a blade in the second chassis that has a light amount of network traffic from the network ingress switch in the second chassis, and a light amount of NIC traffic going out of that blade, will be classified as a good candidate to take over the workload of the overworked first blade from the first chassis.

Once the overworked first blade in the first chassis and its replacement second blade in the second chassis have been identified, the first blade is allowed to complete any running jobs (block 416). This avoids the overhead associated with context switching that an abrupt cancellation of pending workloads would cause. However, as soon as the pending jobs are complete (query block 418), the first blade is disengaged from the first chassis (block 420).

As will be described below, once the first blade is disengaged (deactivated), a second blade in another chassis will be engaged (activated). In a preferred embodiment of the present invention, this deactivation/activation is performed by programmatically remapping a boot drive from the first blade to the second blade, as described above in FIG. 2. As described above, the overworked first blade is deactivated by taking down the boot program (and thus the operating system) of the overworked first blade, thereby disabling the overworked first blade. At the same time, the failover blade in the second chassis is mapped to the same boot drive, which is stored in an external storage system (e.g., boot storage 230 shown in FIG. 2). This same boot drive (boot drive 228 shown in FIG. 2) is the same boot drive that was used by the overworked first blade in the first chassis before being taken down.

Alternatively, the first blade may be disengaged/deactivated/disabled and the failover blade may be engaged/activated/enabled using four alternate procedures, either alone or in combination. The first method of disengagement is via software, which directs a management module in the first chassis to send no more work to the first blade. The second way is via a software chassis interface to a first backbone in the first chassis, such that decoupling of the first blade from the first chassis is achieved by software that disables the software chassis interface. A third method uses a coupling switch (not shown in the figures), which is a software controlled hardware switch that couples/decouples the blade from the chassis backbone. A fourth method uses linear motion hardware, wherein the first blade is coupled via a hardware socket to a chassis backbone in the first chassis, and wherein the decoupling of the first blade from the first chassis is performed by a linear hardware mechanism that physically unplugs the first blade from the first backbone in the first chassis. If the fourth method is utilized, the linear hardware mechanism may be controlled by software that is responsive to the first chassis being overutilized. In one embodiment in which this linear hardware mechanism is used, the linear hardware mechanism causes an unplugged first blade to protrude away from the first chassis beyond other blades in the first chassis, wherein a protruding blade provides a visual indicator of which blade in the blade chassis has been physically unplugged.

Figure 5:
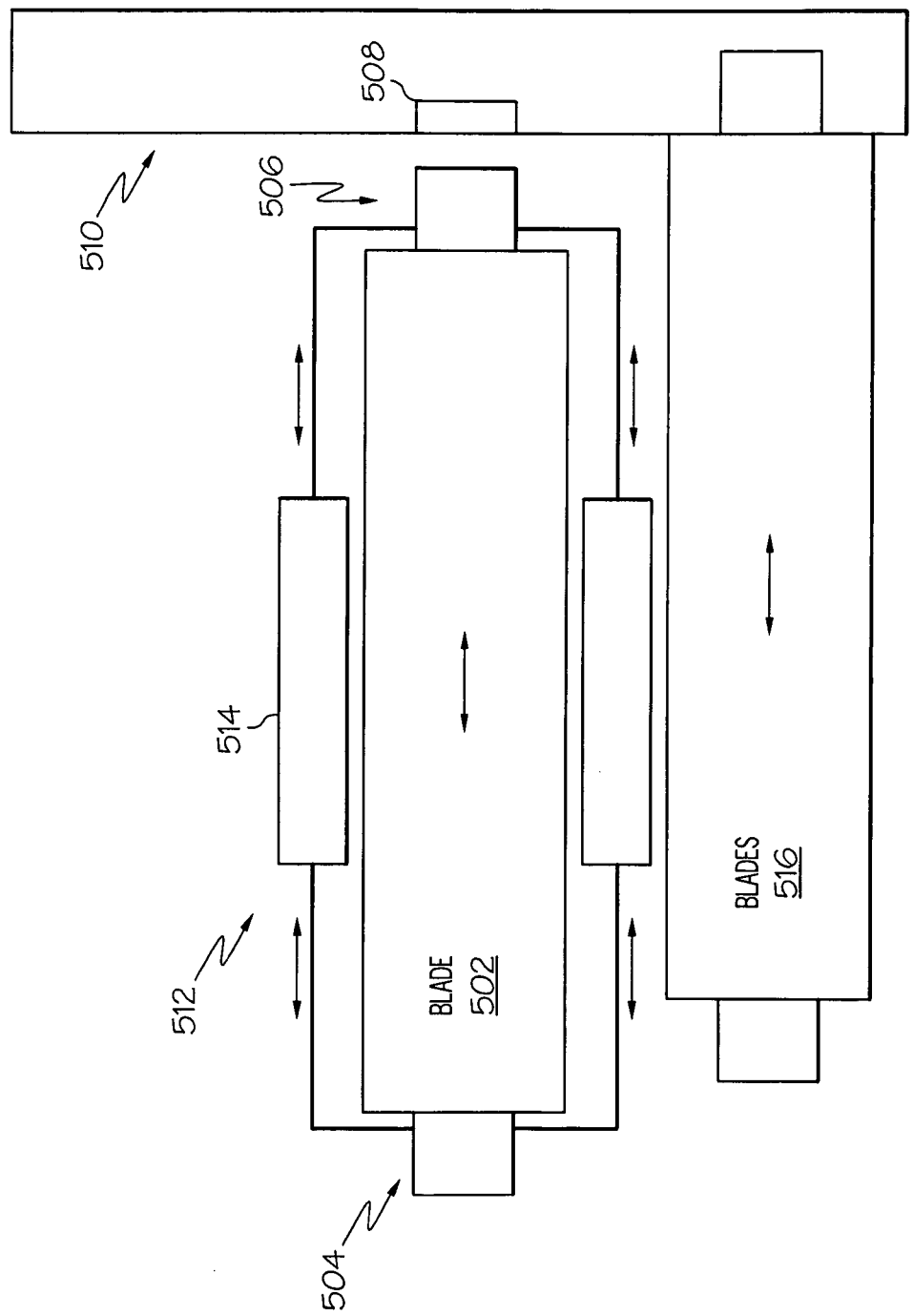
FIG. 5 depicts a linear mechanism for physically and mechanically decoupling a server blade from a blade chassis.

Referring now to FIG. 5, additional detail is provided for the fourth method for uncoupling the blade as described above. Consider blade 502, which has a first end 504 and a second end 506. The second end 506 includes coupling pins/slots/contacts that mate with a physical socket 508 in a chassis backbone 510 (e.g., chassis backbone 157, 218, and/or 220 shown above in FIGS. 1-2). Blade 502 is mounted within a linear hardware mechanism 512, which includes a linear actuator 514, which is fixedly mounted in order to provide support for the linear motion described herein. Linear actuator may be a hydraulic actuator, a rack and pinion, or any other mechanism capable of producing adequate linear force to engage/disengage second end 506 and physical socket 508. When blade 502 is physically disengaged in a chassis that has other blades, the linear motion causes blade 502 to protrude away from chassis backbone 510, giving a quick visual cue as to which blade has been disengaged from the chassis (and thus should be examined for defects, work distribution problems, anomalies, etc.) compared to the other blades 516, which are physically closer to chassis backbone 510 due to being coupled to same. This physical disengagement prevents the blade from inadvertently being allowed to remain active within the chassis.

Returning now to FIG. 4, once the overworked first blade has been disengaged from the first chassis, a second blade in a second chassis is engaged in the second chassis. This second blade may be a blade that was not previously coupled to the second chassis, and can now be engaged using a reverse of any of the four methods described above for disengaging the overworked first blade in the first chassis. Alternatively, the second blade may simply be an underutilized blade, as determined by the steps described above for identifying the overworked first blade in the first chassis. In either scenario, in a preferred embodiment of the present invention, the second blade has either no operating system booted up (if it wasn't coupled to the second chassis at all) or has the wrong operating system (if it was previously coupled to the second chassis). Thus, before assigning work, which would have been sent to the overworked first blade in the first chassis, to the second blade in the second chassis, the second blade is booted up with a copy of the same operating system that the first blade was running before being decommissioned (block 424). Thereafter, any future work that would have been sent to the first blade in the first chassis is now sent to the second blade in the second chassis by the load balancing manager (block 426). Although the process is shown as ending at terminator block 428, it is to be understood that the process can reiterate if the second chassis becomes overworked, thus causing a failover back to the same first blade or another blade in the first chassis.

Figure 6:
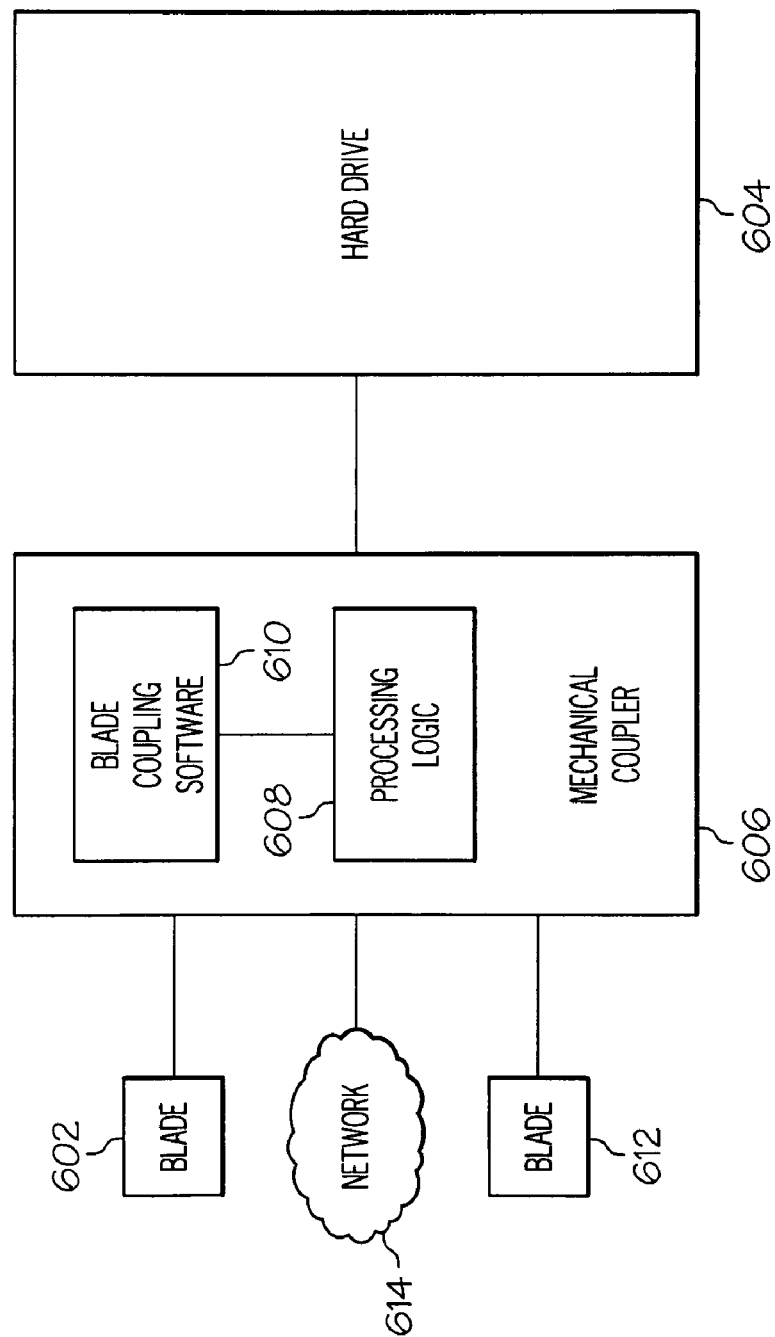
FIG. 6 illustrates a mechanical coupler used to intelligently and selectively couple/decouple server blades to a same hard drive.

With reference now to FIG. 6, an alternate embodiment of the present invention, and in particular to how the first blade is disabled and the second blade is enabled (see blocks 420 and 422 in FIG. 4), is presented. Initially, the first blade in the first chassis (shown as blade 602) is coupled to its dedicated hard drive 604 (e.g., hard drive 134 shown in FIG. 1) via a mechanical coupler 606. Mechanical coupler 606, which includes processing logic 608 that is under the control of a blade coupling software 610, includes a physical switch that mechanically connects blade 602 to hard drive 604. If the blade coupling software 610 detects that the blade 602 has been overworked (according to parameters described above), then the mechanical coupler 606 is instructed to mechanically disconnect blade 602 from hard drive 604, and to mechanically connect a blade 612 to the hard drive 604. Blade 612 may be coupled to the mechanical coupler 606 via a network 614, such as a LAN, etc. Alternatively, blade 612 may be directly and mechanically connected to mechanical coupler 606. In a preferred embodiment, blade 612 is in another blade chassis than blade 602 (e.g., blade 602 is blade 214n while blade 612 is blade 216a shown in FIG. 2). Alternatively, blade 602 and blade 612 are within a same blade chassis. By coupling the second blade 612 to the hard drive 604 while decoupling the first blade 602 from the hard drive 604, the first blade 602 is now unable to read data and instructions to and from the hard drive 604, thus disabling it. Furthermore, by coupling the second blade 612 to the hard drive 604, the second blade 612 is now able to 1) boot the first blade's operating system, and 2) read context data and application software that were previously used by the first blade, thereby enabling the second blade to seamlessly assume the role and duties of the first blade.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Similarly, the terms "chassis" and "blade chassis" are understood to be interchangeable, as are the terms "blade" and "server blade," "chassis backbone" and "backbone," and other terms whose context should be understood as being synonymous with similar terminology.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that, as described in exemplary embodiments above, any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A computer-implemented method for load balancing work between multiple blade chassis in a blade center, the computer-implemented method comprising:
    monitoring, via a management module in a first chassis, a network ingress switch for chassis data traffic ingressing to the first chassis;
    monitoring, via a software network agent on a first blade in the first chassis, a plurality of Network Interface Cards (NICs) on the first blade for first blade data traffic ingressing to and egressing from the first blade; and
    determining that the first blade and the first chassis are being overutilized based on a delay that is longer than a predetermined length of time between data arriving at the network ingress switch and leaving via the plurality of NICs on the first blade and either:
    (1) measuring a first resource usage level for the first chassis, wherein a resource usage level is based on how many total hardware resources from blades in the first chassis are being used compared to how many total hardware resources from blades in the first chassis are available; measuring a second resource usage level for a second chassis, wherein the second resource usage level is less than the first resource usage level; computing a difference between the first resource usage level and the second resource usage level to determine a resource usage level difference; and determining that the first chassis is overutilized if the resource usage level difference exceeds a predefined action level; or
    (2) measuring first blade chassis data traffic, wherein the first blade chassis data traffic is data traffic that is addressed to the first blade and that passes through the network ingress switch; measuring first blade NIC data traffic, wherein the first blade NIC data traffic is data traffic that has been processed by the first blade and egresses from the first blade; and computing a difference between the first blade chassis data traffic and the first blade NIC data traffic, wherein a predetermined difference indicates an overutilization of resources in the first blade in the first chassis;
    in response to the determination that the first blade and the first chassis are being overutilized:
    deactivating the first blade from the first chassis,
    and activating a second blade in a second chassis.

2. The computer-implemented method of claim 1, further comprising: re-routing, to the second blade, any future data traffic that is addressed to the first blade.

3. The computer-implemented method of claim 1, wherein the first blade is identified as an overutilized blade to be decoupled from the first chassis by determining that data traffic on the NICs exceeds a predetermined NIC data traffic level.

4. The computer-implemented method of claim 1, further comprising: in response to the first blade being decoupled from the first chassis, booting the second blade with a same operating system that was used by the first blade prior to being decoupled.

5. The computer-implemented method of claim 1, wherein the first blade is coupled via a software chassis interface to a first backbone in the first chassis, and wherein the deactivating of the first blade from the first chassis is achieved by software that disables the software chassis interface.

6. The computer-implemented method of claim 1, wherein the first blade is coupled via a hardware socket to a first backbone in the first chassis, and wherein the deactivating of the first blade from the first chassis is performed by a linear hardware mechanism that physically unplugs the first blade from the first backbone in the first chassis.

7. The computer-implemented method of claim 6, wherein the linear hardware mechanism is controlled by software that is responsive to the first chassis being overutilized, wherein the linear hardware mechanism causes an unplugged first blade to protrude away from the first chassis beyond other blades in the first chassis, and wherein a protruding blade provides a visual indicator of which blade in the blade chassis has been physically unplugged.

8. A non-transitory computer-readable storage medium on which is encoded a computer program, the computer program comprising computer executable instructions configured for:
   monitoring, via a management module in a first chassis, a network ingress switch for chassis data traffic ingressing to the first chassis;
   monitoring, via a software network agent on a first blade in the first chassis, a plurality of Network Interface Cards (NICs) for first blade data traffic ingressing to and egressing from the first blade; and
   determining that the first blade and the first chassis are being overutilized based on a delay that is longer than a predetermined length of time between data arriving at the network ingress switch and leaving via the plurality of NICs on the first blade and either:
   (1) measuring a first resource usage level for the first chassis, wherein a resource usage level is based on how many total hardware resources from blades in the first chassis are being used compared to how many total hardware resources from blades in the first chassis are available; measuring a second resource usage level for a second chassis, wherein the second resource usage level is less than the first resource usage level; computing a difference between the first resource usage level and the second resource usage level to determine a resource usage level difference; and determining that the first chassis is overutilized if the resource usage level difference exceeds a predefined action level; or
   (2) measuring first blade chassis data traffic, wherein the first blade chassis data traffic is data traffic that is addressed to the first blade and that passes through the network ingress switch; measuring first blade NIC data traffic, wherein the first blade NIC data traffic is data traffic that has been processed by the first blade and egresses from the first blade; and computing a difference between the first blade chassis data traffic and the first blade NIC data traffic, wherein a predetermined difference indicates an overutilization of resources in the first blade in the first chassis;
   in response to the determination that the first blade and the first chassis are being overutilized:
   deactivating the first blade from the first chassis, and activating a second blade in a second chassis.

9. The non-transitory computer-readable storage medium of claim 8, wherein the computer executable instructions are further configured for: re-routing, to the second blade, any future data traffic that is addressed to the first blade.

10. The non-transitory computer-readable storage medium of claim 8, wherein the first blade is identified as an overutilized blade to be decoupled from the first chassis by determining that data traffic on the NIC exceeds a predetermined NIC data traffic level.

11. The non-transitory computer-readable storage medium of claim 8, wherein the computer executable instructions are further configured for: in response to the first blade being decoupled from the first chassis, booting the second blade with a same operating system that was used by the first blade prior to being decoupled.

12. The non-transitory computer-readable storage medium of claim 8, wherein the first blade is coupled via a software chassis interface to a first backbone in the first chassis, and wherein the deactivating of the first blade from the first chassis is achieved by disabling the software chassis interface.

13. The non-transitory computer-readable storage medium of claim 8, wherein the first blade is coupled via a hardware socket to a first backbone in the first chassis, and wherein the deactivating of the first blade from the first chassis is performed by a linear hardware mechanism that, under a control of the computer program, physically unplugs the first blade from the first backbone in the first chassis.

14. The non-transitory computer-readable storage medium of claim 13, wherein the linear hardware mechanism causes an unplugged first blade to protrude away from the first chassis beyond other blades in the first chassis, wherein a protruding blade provides a visual indicator of which blade in the blade chassis has been physically unplugged.

15. The non-transitory computer-readable storage medium of claim 8, wherein the computer executable instructions are provided by a service provider to a load balancing manager in an on-demand basis.

* * * * *